United States Patent
Meyer et al.

(10) Patent No.: US 12,049,765 B2
(45) Date of Patent: Jul. 30, 2024

(54) PORTABLE HOT SWAGED COUPLING DEVICE FOR CONNECTING ARTICLES

(71) Applicant: Life Coded, LLC, New York, NY (US)

(72) Inventors: John J. Meyer, New York, NY (US); Benjamin C. Nichols, Elmwood Park, NJ (US)

(73) Assignee: Life Coded, LLC, New York, NY (US)

( * ) Notice: Subject to any disclaimer, the term of this patent is extended or adjusted under 35 U.S.C. 154(b) by 437 days.

(21) Appl. No.: 17/380,701

(22) Filed: Jul. 20, 2021

(65) Prior Publication Data

US 2023/0026910 A1  Jan. 26, 2023

(51) Int. Cl.
| | |
|---|---|
| *B21J 9/00* | (2006.01) |
| *B21J 9/06* | (2006.01) |
| *E04G 21/12* | (2006.01) |
| *B25J 11/00* | (2006.01) |

(52) U.S. Cl.
CPC .............. *E04G 21/122* (2013.01); *B21J 9/06* (2013.01); *B25J 11/005* (2013.01)

(58) Field of Classification Search
CPC ....... B21J 9/06; B21J 9/022; B21J 9/00; B21J 9/12; B21J 9/10; B23P 11/00; B23P 11/05; B23P 11/025
See application file for complete search history.

(56) References Cited

U.S. PATENT DOCUMENTS

| | | |
|---|---|---|
| 2,064,129 A | 12/1936 | Temple, Jr. |
| 3,033,600 A | 5/1962 | Drysdale |
| 3,253,332 A | 5/1966 | Howlett et al. |
| 3,415,552 A | 12/1968 | Howlett |
| 3,551,999 A | 1/1971 | Gutmann |
| 3,769,678 A | 11/1973 | Marsden |
| 3,969,920 A | 7/1976 | Marsden et al. |
| 4,241,490 A | 12/1980 | Edwards |
| 4,666,326 A | 5/1987 | Hope |
| 4,926,685 A | 5/1990 | Shannon, Sr. |
| 5,046,878 A | 9/1991 | Young |
| 5,080,406 A | 1/1992 | Hyatt et al. |
| 5,350,902 A | 9/1994 | Fox et al. |
| 5,468,524 A | 11/1995 | Albrigo et al. |
| 5,630,958 A | 5/1997 | Stewart, Jr. |
| 5,681,126 A | 10/1997 | Lin |
| 5,786,575 A | 7/1998 | Bleske et al. |
| 6,202,282 B1 | 3/2001 | Holdsworth |
| 6,229,127 B1 | 5/2001 | Link |
| 6,509,555 B1 | 1/2003 | Riess et al. |
| 6,532,711 B2 | 3/2003 | Gregel et al. |

(Continued)

OTHER PUBLICATIONS

International Search Report and Written Opinion in PCT Application No. PCT/US2022/037428, mailed Dec. 2, 2022 (10 pages).

*Primary Examiner* — Lee D Wilson
(74) *Attorney, Agent, or Firm* — Leason Ellis LLP

(57) ABSTRACT

A method of spicing together and joining ends of a first member and a second member includes the steps of: arranging the ends of the first member and the second member in side-by-side manner; placing a coupling sleeve over the ends of the first member and the second member; and using a portable, hot-swaged coupling device to heat and crimp the coupling sleeve about the ends of the first and second member, thereby joining the ends of the first and second members.

24 Claims, 16 Drawing Sheets

(56) References Cited

U.S. PATENT DOCUMENTS

| | | | |
|---|---|---|---|
| 6,875,966 B1 | 4/2005 | Barber et al. | |
| 6,966,104 B2 | 11/2005 | Gregel et al. | |
| 7,202,450 B2 | 4/2007 | Barber et al. | |
| 7,491,916 B1 | 2/2009 | Barber et al. | |
| 7,891,067 B2 * | 2/2011 | Muhlenbruck | A01K 85/00 29/272 |
| 8,336,177 B2 * | 12/2012 | Vernasca | B25B 27/146 72/402 |
| 8,904,848 B2 * | 12/2014 | Frenken | B21D 39/048 72/402 |
| 9,085,023 B2 * | 7/2015 | Danhash | B21D 39/04 |
| 9,266,165 B2 | 2/2016 | Dahl | |
| 10,828,757 B2 * | 11/2020 | Gallegos | B25B 27/10 |
| 2003/0167614 A1 * | 9/2003 | Morrison | B25B 27/10 29/237 |
| 2005/0050843 A1 | 3/2005 | Colarusso et al. | |
| 2005/0072102 A1 | 4/2005 | Hopwood | |
| 2005/0081359 A1 * | 4/2005 | Palejwala | B25B 27/10 29/516 |
| 2005/0169701 A1 | 8/2005 | Kies et al. | |
| 2008/0060291 A1 | 3/2008 | Braun | |
| 2008/0172979 A1 | 7/2008 | Wilson et al. | |
| 2010/0253066 A1 | 10/2010 | Cygler, III et al. | |
| 2023/0026910 A1 * | 1/2023 | Meyer | E04G 21/122 |

* cited by examiner

PORTABLE HOT SWAGED COUPLING DEVICE FOR CONNECTING ARTICLES

TECHNICAL FIELD

The present disclosure is generally directed to the field of tools and more particularly, is directed to a mobile or hand-held hot-swaged coupling device (tool) for connecting structural concrete reinforcing bars.

BACKGROUND

There are many methods and devices for connecting structural concrete reinforcing bars. These methods include welded lap splices, threaded couplers, grout-filled coupling sleeves, shear screw coupling sleeves, and cold swaged coupling sleeves, among others. Each of these methods has its benefits and limitations.

Simple lap splices and welded lap splices require significant overlap of the two reinforcing bars, which for a #8 bar can exceed 80 inches in length, which limits the useful application for these methods. For retrofitting and repair applications, this involved cutting or chipping back existing concrete to expose a suitable bar length for the splice, which results in high labor and concrete waste. In addition, welded splices require highly skilled labor, are time-consuming to complete, and are difficult to inspect.

There are many types of coupling sleeves, including threaded sleeves, grout-filled sleeves, steel-filled sleeves, shear screw coupling sleeves, and cold-swaged coupling sleeves. For both new and existing construction, reinforcing bars surrounding the bars to be coupled are often in the way of bulky coupling equipment or couplers. They also require additional concrete cover due to the bulky coupler. Many of these coupling sleeves cannot be used for retrofitting and repair applications, and those that can, such as the shear screw coupling sleeve, are expensive and time-consuming to install.

Arc welding of reinforcing steel has many challenges, whether by manual or automated processes. Reinforcing steel is typically high-strength steel, such as ASTM A615. However, steel weldability is inversely related to tensile strength, which results in reinforcing steel having more weldability issues than other lower strength steel grades. Special care must be taken to ensure the correct welding electrode is being used, the reinforcing steel is preheated to the correct temperature prior to welding, and that the reinforcing steel and weld material are allowed to cool slowly after the weld is completed. Failure of any of these steps can cause micro-cracking and embrittlement in the steel, which can lead to joint failure. For this reason, welded joints of reinforcing steel must be performed by certified welders and inspected by certified inspectors.

SUMMARY

In one embodiment, the present disclosure provides a mobile or hand-held, hot-swaged coupling device for connecting structural concrete reinforcing bars in a method that has multiple benefits over existing coupling devices. The heated coupling sleeve (e.g., steel coupling sleeve) requires less force to crimp than a cold-swaged sleeve, which results in a coupling device which is much smaller, lighter, and easier to handle than a cold-swaged coupler. The simplicity of the hot-swaged coupling sleeve results in a much faster installation than other coupling methods.

The unique C-shape sleeve combined with the crimping process gives this method several advantages. It allows for two existing steel bars to be connected without twisting or moving either of the bars, and it provides for three-axis placement tolerance for the steel bars, which is essential since reinforcing bars are rarely found placed perfectly. With varying sizes of the C-shaped sleeve, two different sized bars can also be spliced, which is currently not possible with other methods. In retrofitting and repair applications, steel bars can be connected with a much shorter bar protrusion from the existing concrete, resulting in reduced labor and less concrete repair material than other splice methods.

The disclosed device does not require extensive training and certification like traditional welded splice methods, preventing human error construction defects. It also does not require any special treatment to the reinforcing steel bars before coupling, which gives this system an advantage compared to threaded couplers.

The design of the device provides for a crimping jaw with interchangeable dies capable of withstanding temperatures greater than 3,000 degrees Celsius, which is far in excess of the melting temperature of steel. The dies are made of high temperature resistant material with high hardness, such as titanium with a titanium carbide coating, or other material with similar properties. When compressed, the die imprints a mark on the steel sleeve when the splice has adequately heated and is complete, simplifying inspection of the splice and increasing quality control. The enclosed heating element also provides a safer process than welded splices, including preventing skin burns, eye damage, and fire.

The hot-swaged coupling device can be animated by a variety of means. For example, the coupling device can be attached to a wearable exoskeleton apparatus, allowing the operator to move the device with greater precision and minimal strain to the operator. Additionally, the coupling device can be mounted on an articulated robotic arm, allowing for greater automation of the coupling process. The robotic arm in turn can be mounted on a mobility platform, which can house the power supply system and the central processing unit for controlling the robotic arm and the coupling device. The robotic arm can also be mounted to stationary elements, such as to a concrete floor slab or to a vertical concrete wall or column. The coupling device can also be carried and operated by hand similar to more traditional tools.

A vision system, which can comprise of one or more camera, lidar, radar, sonar, or the like, is connected to the coupling device housing and provides data to the central processing unit of the device. The data from the vision system is fed through a processing neural network capable of identifying steel bars and returning spatial data to the central processing unit. This spatial data can be used to locate steel reinforcing bars and to improve the precision of the coupling device placement.

Prior to crimping by the dies, the coupling sleeve is heated to the forging temperature of the coupling sleeve material by induction heaters in the jaw of the device. The induction heaters are comprised of electrically conductive metal tubes formed into semi-circle coil shapes. The metal tube coils are cooled by coolant which is circulated through the coils to moderate the temperature of the heating coils. The coolant is circulated from the induction coils to a heat exchanger toward the back of the coupling device housing. The heat exchanger is comprised of a conductive metal which absorbs heat from the coolant. Alternatively, the induction coils can be cooled by means of a conductive heat sink which conducts heat from the coils to the heat exchanger. The heat exchanger is in turn cooled by the ambient air, which is forced through the heat exchanger by an internal fan.

Once the splice is completed by the coupling device, the integrity of the splice is verified by sending an electrical pulse from one bar, across the splice, and to the other bar where the pulse is measured. The electrical pulse is sent by and electrical contact on one side the crimping jaw coming into contact with the first bar and is sensed by a second electrical contact coming into contact with the second bar. This measurement process ensures that there is adequate contact and bonding between the coupling sleeve and the reinforcement bars.

This new splice method also allows for greater efficiencies for new construction by providing a quick way to connect modular precast concrete elements without the need for bulky embedded steel plates or labor-intensive on-site welding. The proposed method opens the door for more prevalent use of structural precast concrete elements in construction, including but not limited to slabs, walls and columns, along with their benefits of reduced cost and erection time, reduced labor and material waste, and increased quality control and safety.

In one embodiment, a mobile, hot-swaged coupling device for connecting a first member to a second member. The device includes a housing and a first jaw and a second jaw each of which is movably coupled to the housing and moves between an open position and a closed position. The first jaw has a first surface, and the second jaw has a second surface that faces the first surface. The device includes first and second interchangeable dies. The first interchangeable die is coupled to the first surface, while the second interchangeable die is coupled to the second surface. In the closed position of the first and second jaws, the first and second interchangeable dies seat against one another and define an enclosed opening. Each of the first interchangeable die and the second interchangeable die has an exposed inner surface for receiving and forming a coupling sleeve about ends of the first member and the second member when the first and second jaws are in the closed position. The device further includes a heating mechanism for heating the C-shaped coupling sleeve.

A method of spicing together and joining ends of a first member and a second member includes the steps of: arranging the ends of the first member and the second member in side-by-side manner; placing a coupling sleeve over the ends of the first member and the second member; and using a portable, hot-swaged coupling device to heat and crimp the coupling sleeve about the ends of the first and second member, thereby joining the ends.

BRIEF DESCRIPTION OF DRAWING FIGURES

Figure 4:
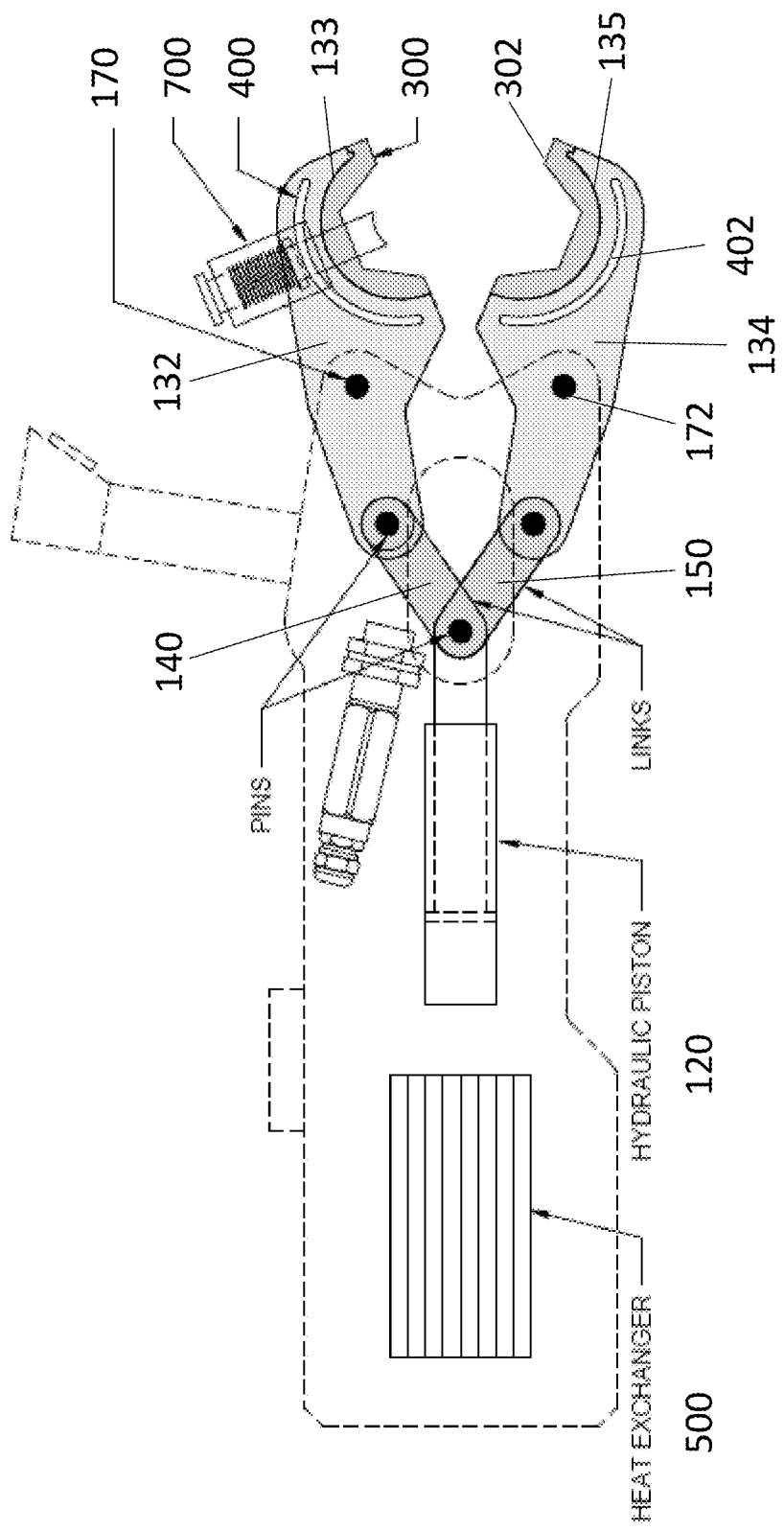
Figure 5:
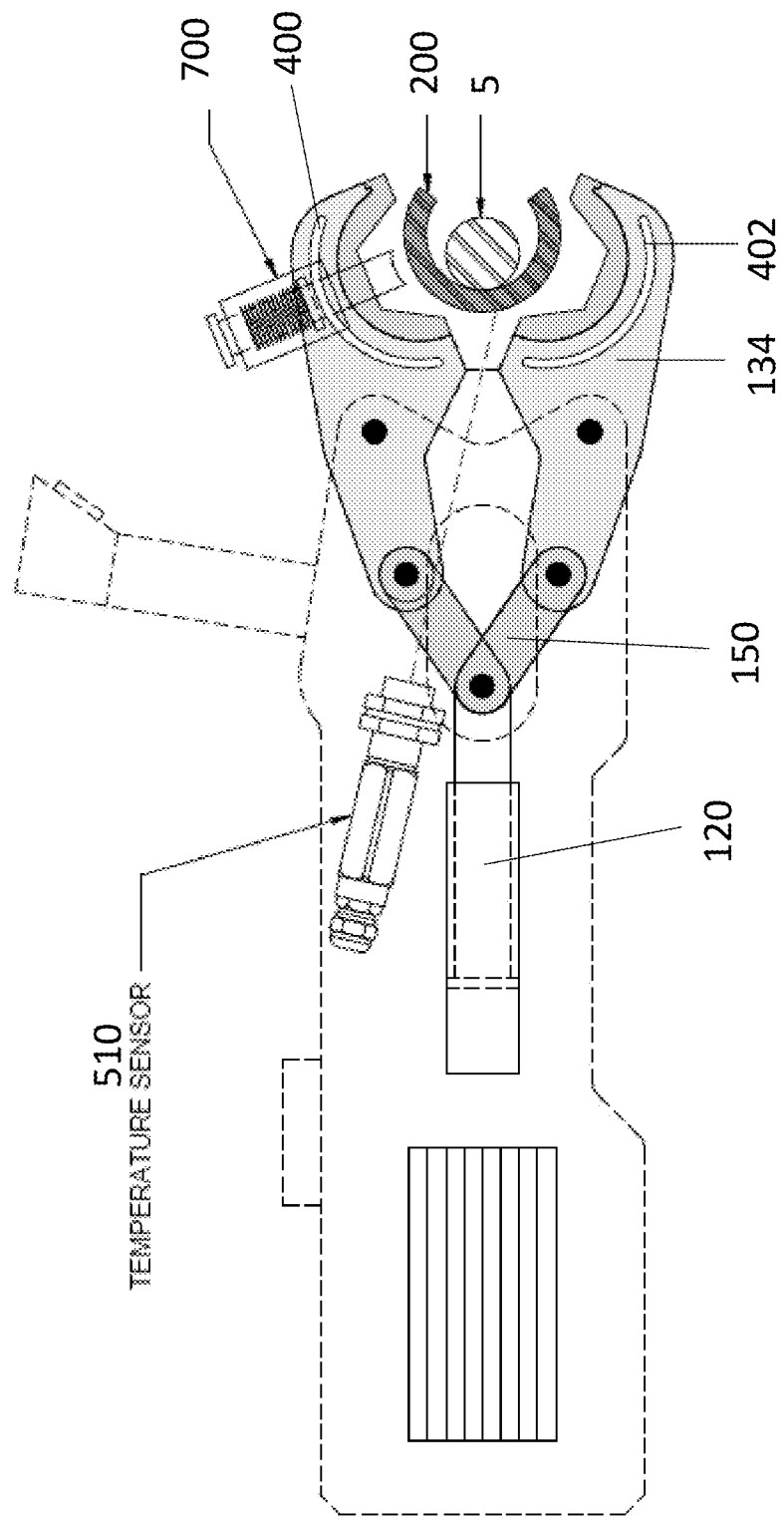
Figure 6:
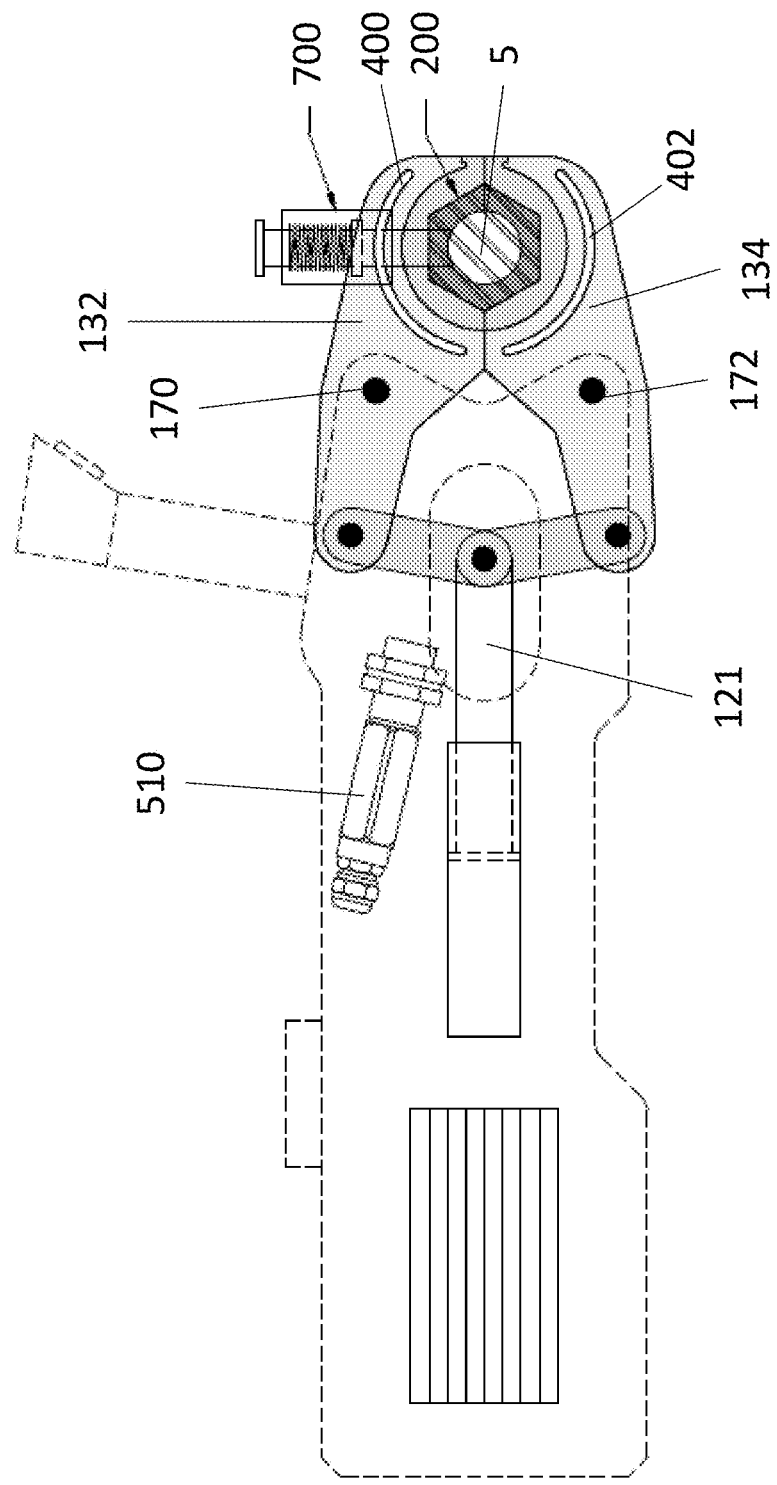
Figure 7B:
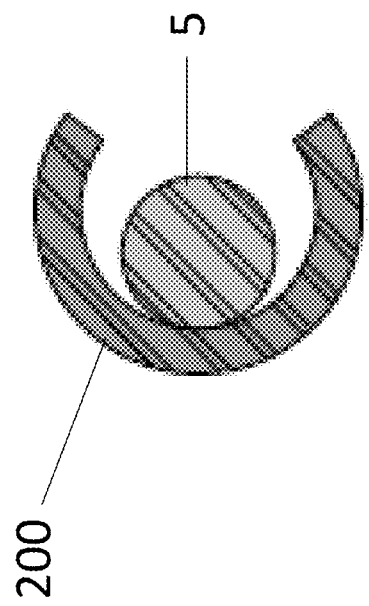
Figure 7A:
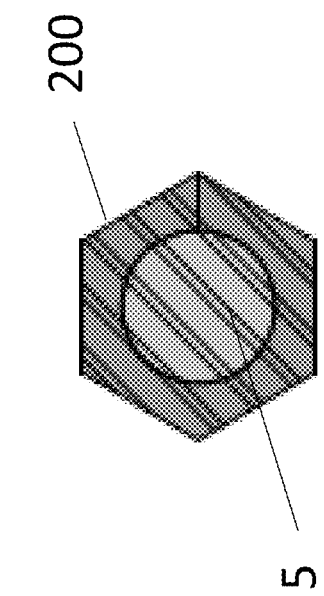
Figure 8:
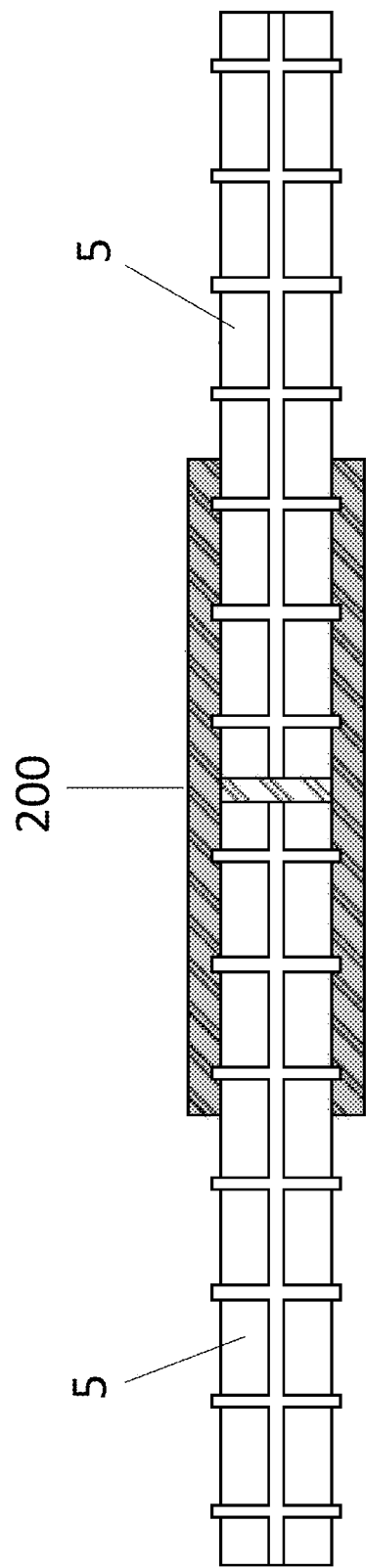
Figure 9A:
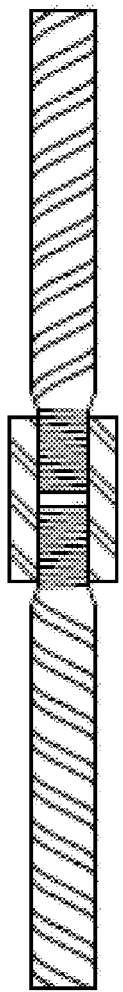
Figure 9C:
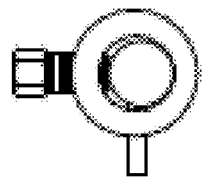
Figure 9B:
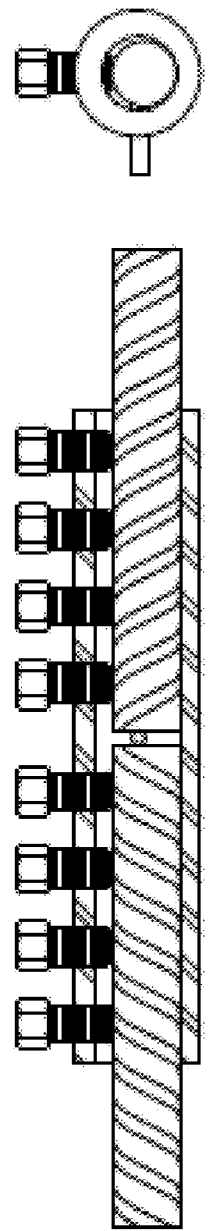

FIG. 4. is a section view of a crimp jaw in the fully open position;

FIG. 5 is a section view of the crimp jaw in the fully open position placed around a concreate reinforcing bar with a C-shape coupling (splice) sleeve;

FIG. 6 is a section view of the crimp jaw in the closed position with the crimped coupling sleeve around the concrete reinforcing bar (steel bar);

FIGS. 7A and 7B are section views of the concrete reinforcing bar with the coupling sleeve in the un-crimped state (FIG. 7A) and the crimped state (FIG. 7B);

FIG. 8 is a cross-section view of the coupling sleeve crimped around two adjoining bars;

FIGS. 9A-C are views of an existing alternative splice mechanism to join two bars;

FIGS. 10A-10F are perspective views of a splicing sequence; and

Figure 11:
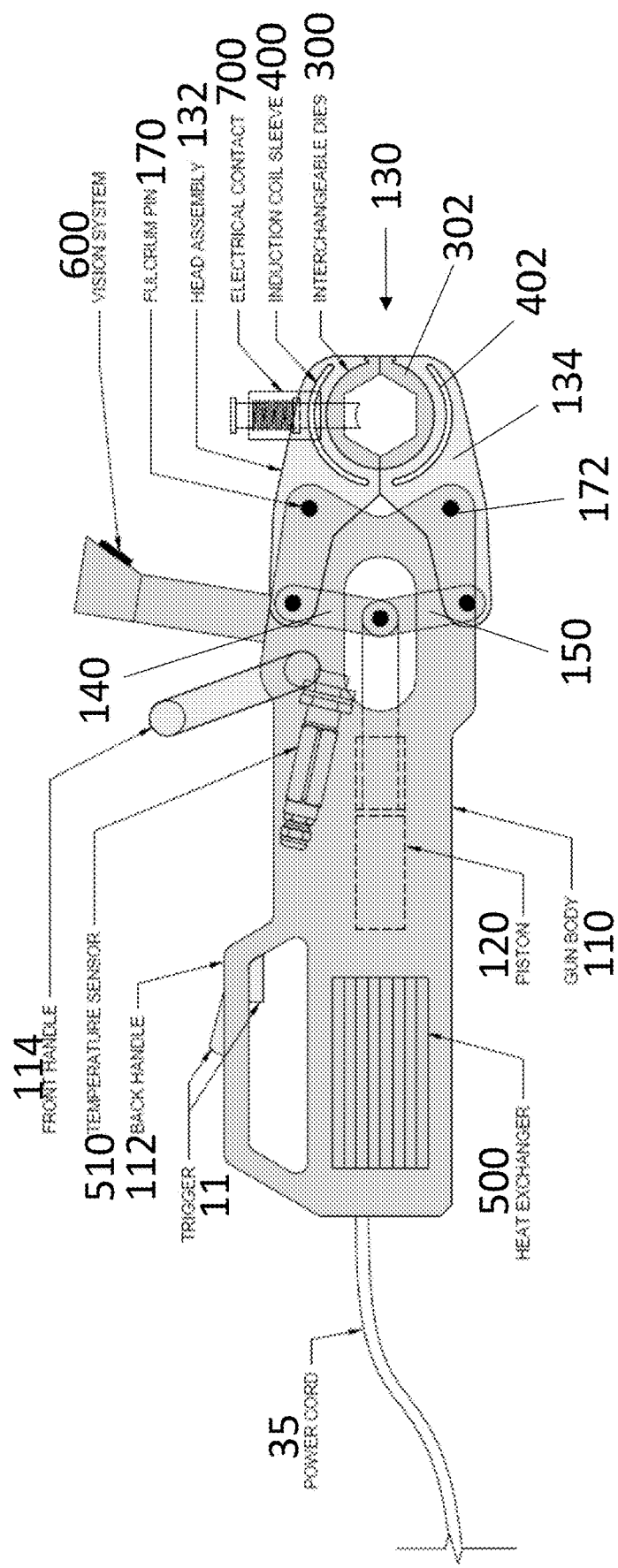

FIG. 11 is an elevation view of a hand-held, portable hot swaged coupling device that includes a crimping jaw assembly.

DETAILED DESCRIPTION OF CERTAIN EMBODIMENTS

FIGS. 1-7B illustrate a mobile hot swaged coupling device 100 for connecting two articles, such as structural concrete reinforcing bars 5. The device 100 can also be referred to as being a splice gun. The coupling device 100 is particularly configured to connect two concrete reinforcing steel bars 5 end to end and can be used to replace welded splices. The splice method described herein is substantially faster than welding while also exceeding the strength of welded bar splices. This results in a reinforcement bar connection that can replace lap splices, which significantly reduces the amount of steel and minimizes reinforcement congestion. Additionally, the speed of this splicing method reduces construction time and labor.

Mobile Robotic System

In one embodiment, the device 100 is incorporated into a mobile platform that can be automated and can be driven to a given target location and/or controlled by a user to perform the intended operations. As illustrated, a mobile system 10 can be provided and includes a mobile platform 20 that can be driven to a target location. In the illustrated embodiment, the mobile platform 20 is in the form of a vehicle that has wheels 30. The mobile platform 20 comprises a robotic system in that it can include one or more robotic arms that serve as the means that attach the device 100 to the mobile platform 20. In the illustrated embodiment, there is a first arm 40 and a second arm 50. The first arm 40 attaches to the mobile platform 20 and the device 100 is coupled to the second arm 50. The arms 40, 50 provide multiple degree of movements of the device 100 relative to the mobile platform 20.

Cables 60 are shown and are connected between the device 100 and the robotic arm 50.

Coupling Device 100

The coupling device 100 is formed of a number of parts and assemblies as described herein. The coupling device 100 is a mobile device that is powered using a suitable power supply (battery pack, etc.). One of the cables 60 can provide power between the device 100 and the power supply located on the mobile platform 20. In another embodiment shown in FIG. 11, the device 100 is a hand-held unit and the power supply can consist of an AC outlet to which a power cord 35 is inserted. The power cord 35 has a plug at one end and the other end is connected to the coupling device 100. Alternatively, the power supply can be in the form of a battery pack (e.g., rechargeable battery pack) that is connected to the coupling device 100 and can even be part of the main housing of the hand-held unit.

Housing 110

The coupling device 100 includes a housing (main body) 110 that defines the exterior of the coupling device 100 and defines the hollow interior in which certain components of the coupling device 100 are included, such as electronics and other working parts. The coupling device 100 has a distal (front) end 102, an opposite proximal (rear) end 104, a top 106 and a bottom 108.

Figure 3:
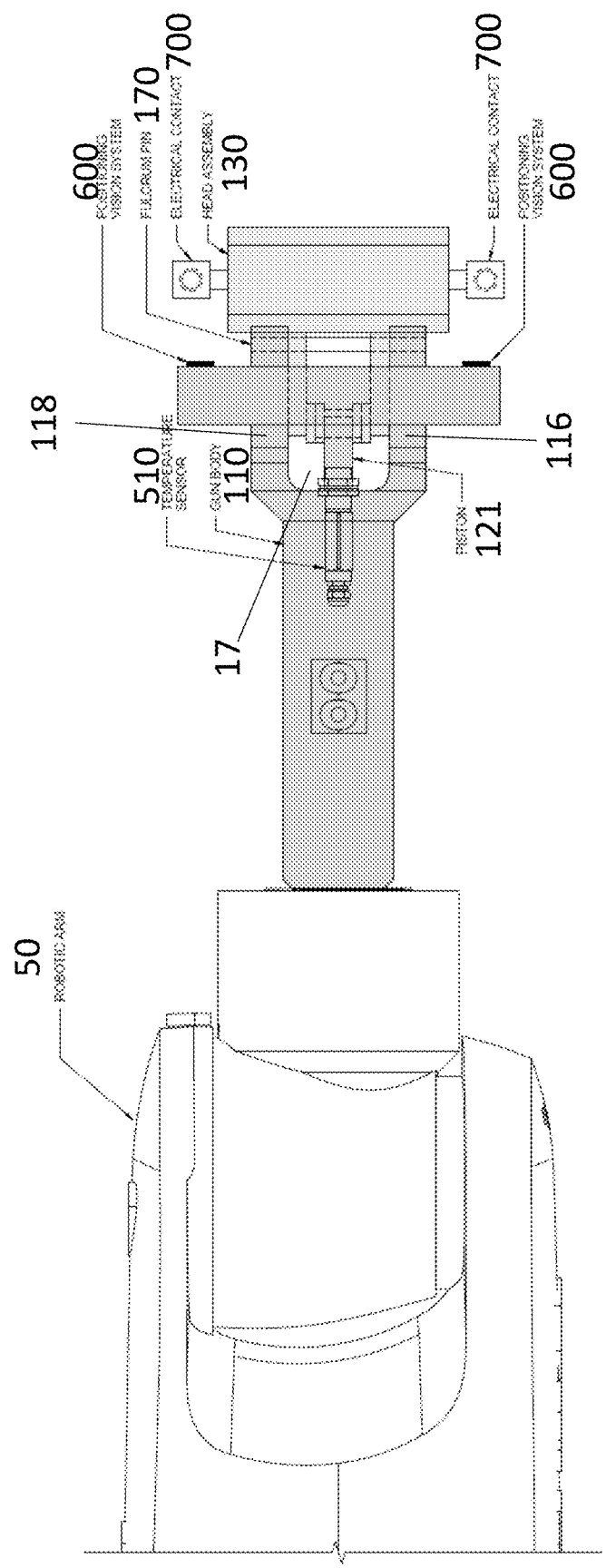
FIG. 3 is a top view of the mobile hot swaged coupling device.

The distal end 102 of the housing 110 has a split fork type construction as best shown in FIG. 3. The split fork type construction is defined by a first leg 116 that defines one side wall (e.g., right side wall) of the housing 110 and a second leg 118 that defines an opposite side wall (e.g., left side wall). An open space 117 is formed between the first leg 116 and the second leg 118.

As described herein, the coupling device 100 is designed to connect two elements together and more particularly, is designed to connect structural concrete reinforcing bars 5 as shown in the figure sequence of FIGS. 10A-10F. The coupling device is used in combination with a coupling (splice) sleeve 200 for connecting the ends of the concrete reinforcing bars 5 so as to form a single interconnected structure. The coupling sleeve 200 is described in more detail below.

Actuator 120

The coupling device 100 has an actuator 120 that is configured to operate the coupling device 100 as described herein and more particularly, the coupling device 100 includes a crimping jaw assembly 130 that can be operated using the actuator 120 to effectuate the coupling of the coupling sleeve 200 to the ends of the concrete reinforcing bars 5. The actuator 120 is thus of a type that can move the crimping jaw assembly 130 between a first position (open position) and a second (closed) position. There are many different types of actuators 120 that can be used to produce such controlled movement of the crimping jaw assembly 130. In the illustrated embodiment, the actuator 120 is in the form of a hydraulic piston that is located inside of the housing 110 and more specifically is located inside the open space 117. As shown, the hydraulic piston can be oriented within the housing 110 such that it extends longitudinally. A front end of the hydraulic piston includes a piston rod 121 that extends forward toward the distal end 102 of the housing 110 and is operatively coupled to the crimping jaw assembly 130.

The device 100 can be operated by a press-button used to control the opening and closing of the crimping jaw as when the device 100 is a hand-held unit as in FIG. 11. Alternatively, when the device is mounted on the robotic arm 50, the device 100 can be operated by a remote control or by a computing device or a smart-device such as a smartphone or tablet connected via Bluetooth or WIFI.

Crimping Jaw Assembly 130

The crimping jaw assembly 130 is designed, as mentioned above, to move between two positions during the process of connecting the coupling sleeve 200 to the ends of the concrete reinforcement bars 5.

The crimping jaw assembly 130 includes a first jaw 132 (which can be considered to be an upper jaw) and a second jaw 134 (which can be considered to be a lower jaw). An underside of the first jaw 132 is defined by a first (bottom) surface 133 and the second jaw 134 is defined by a second (top) surface 135 that faces the first surface 133 (FIG. 4). Each of the two jaws 132, 134 can pivot between the two positions (i.e., between the open and closed positions). In the open position, the first and second jaws 132, 134 are spaced further apart and conversely, in the closed position, the first and second jaws 132, 134 are spaced closer to one another.

The first jaw 132 is pivotally attached to the housing 110 by means of a first fulcrum pin 170 that extends from the first leg 116 across the open space 117 to the second leg 118. The first jaw 132 is thus pivotable about the first fulcrum pin 170. The second jaw 134 is pivotally attached to the housing 110 by means of a second fulcrum pin 172 that extends from the first leg 116 across the open space 117 to the second leg 118. The second jaw 134 is thus pivotable about the second fulcrum pin 172.

Figure 1:
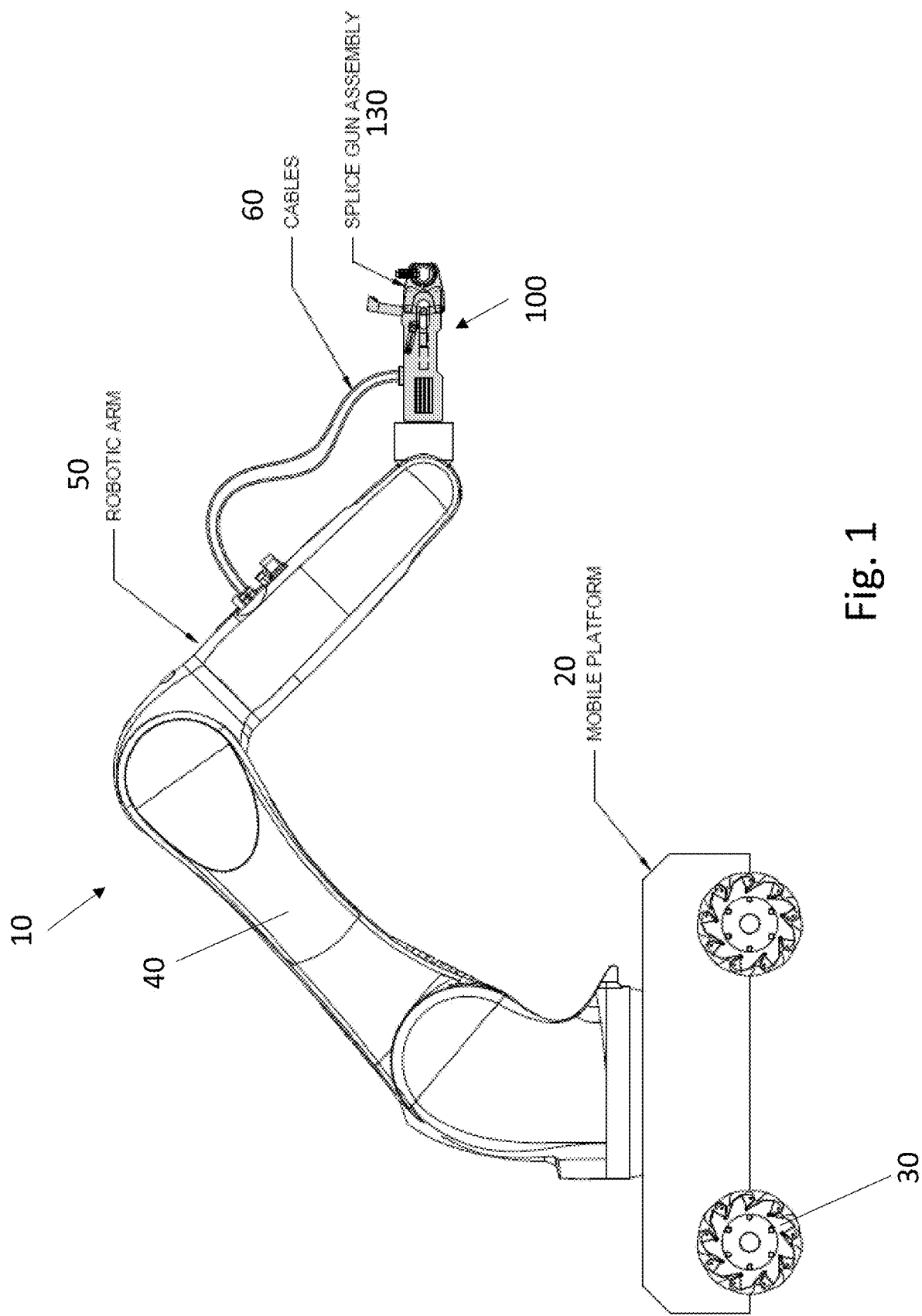
FIG. 1 is an elevation view of a mobile hot swaged coupling device that includes a crimping jaw assembly mounted on a robotic arm, which in turn is mounted on a mobility platform, such as a vehicle.
Figure 2:
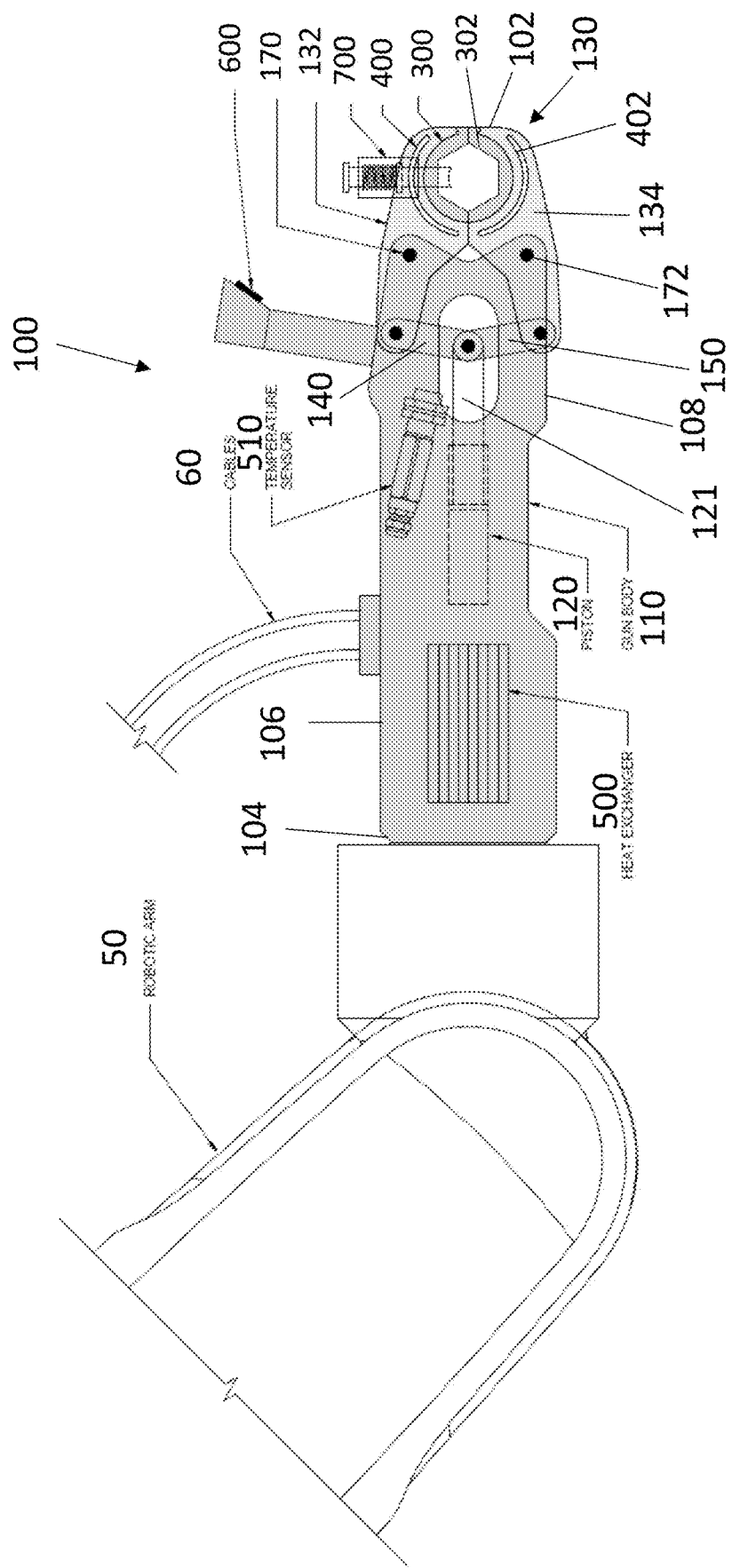
FIG. 2 is an elevation view of the mobile hot swaged coupling device.

The first (open) position of the first jaw 132 and the second jaw 134 is shown in FIG. 4, while the second (closed) position of the first jaw 132 and the second jaw 134 is shown in FIGS. 2 and 6.

The actuator 120 is operatively coupled to the first and second jaws 132, 134 by means of a linkage mechanism. The linkage mechanism comprises a first link 140 and a second link 150. The first link 140 is connected at a first end to the piston rod 121 and is attached at its opposite end to the first jaw 132. Both of these connections are of a pivotable nature. The second link 150 is connected at a first end to the piston rod 121 and is attached at its opposite end to the second jaw 134. Both of these connections are of a pivotable nature. The first ends of both the first and second links 140, 150 are thus connected to the same first end of the piston rod 121.

The first and second links 140, 150 are located within the open space 117 between the first leg 116 and the second leg 118. The first and second links 140, 150 can be connected to their respective parts with pins or the like.

In the first (open) position of the first jaw 132 and the second jaw 134 that is shown in FIG. 4, the piston rod 121 of the hydraulic piston 120 is in retracted position. When the piston rod 121 is in this retracted (rear) position, the first and second links 140, 150 are likewise pulled toward the proximal end of the housing 110 such that a first angle is defined by the first and second links 140, 150. When the piston rod 121 is in the extended (forward) position, the first and second links 140, 150 pivot open resulting in the proximal ends of the first and second jaws 132, 134 being separated further apart and this action causes the distal ends of the first and second jaws 132, 134 being drawn together to the closed position. The linkage mechanism thus provides an easy, effective way to translate action of the actuator 120 into the controlled movement (pivoting) of the first jaw 132 and the second jaw 134 about the first and second fulcrum pins 170, 172.

Interchangeable Dies

As shown in FIGS. 2 and 4, the coupling device 100 includes a pair of interchangeable (crimping) dies 300, 302. The first interchangeable die 300 is coupled to the first surface 133 of the first jaw 132 and similarly, the second interchangeable die 302 is coupled to the second surface 135 of the second jaw 134. As explained herein, the first and second interchangeable dies 300, 302 are configured to shape the coupling sleeve 200 during the crimping process. As such, the first and second interchangeable dies 300, 302 are sized and shaped in view of the coupling sleeve 200 that is intended to be used with the coupling device 100. The first interchangeable die 300 is attached to the first surface 133 in a detachable manner using conventional techniques. For example, the first interchangeable die 300 can snap-fit to the first surface 133 or can slide into a track formed on the first surface 133 and lock in place. The second interchangeable die 302 can be attached to the second surface 135 using the same techniques. Other coupling techniques can be used to easily attach the first interchangeable die 300 to the first surface 133 and similarly, to attach the second interchangeable due 302 to the second surface 135.

As shown in the figures, each of the first surface 133 and the second surface 135 can be concave surfaces. The exposed surface of the first interchangeable die 300 can be semi-hex shaped in that the exposed surface has three exposed angled surfaces. Similarly, the exposed surface of the second interchangeable die 302 can be semi-hex shaped in that the exposed surface has three exposed angled surfaces. When combined together and when the first jaw 132 and the second jaw 134 are in the closed position, the exposed surfaces of the two dies 300, 302 define a hex shaped hole. The illustrated first and second interchangeable dies 300, 302 are thus used to crimp the coupling sleeve 200 into a hex shape as discussed below.

As mentioned, the exposed surfaces of the first and second interchangeable dies 300, 302 can take other shapes. For example, each of these exposed surfaces can be semi-circular in shape. When combined, a circular shaped opening is formed. Alternatively, the exposed surfaces can each have a V-shape, U-shape, etc. Varying the shape of the dies 300, 302 directly influences and shapes the coupling sleeve 200.

In addition, the first and second crimping dies 300, 302 imprint a mark on the coupling sleeve 200 when the splice is completed, which simplifies inspecting the splice and increases quality control.

Coupling Sleeve 200

As mentioned, the coupling sleeve 200 is used to connect the concrete reinforcing bars 5. The coupling sleeve 200 is shown in FIG. 7A in an uncrimped (initial) state and in FIG. 7B, the coupling sleeve 200 is shown in a crimped state. The crimping sleeve 200 is formed of a crimpable material and is designed to surround the ends of the concrete reinforcing bars 5 and be crimped in place. In one embodiment, the crimpable sleeve 200 is made of steel, such as grade 33, grade 40, grade 60, grade 75, grade 80, grade 90, ASTM A615, ASTM 706, and in general the same as the steel material of the reinforcement bars to be coupled.

In the illustrated embodiment, the coupling sleeve 200 in the uncrimped state has a C-shape. The open C-shape allows for insertion of the ends of the concrete reinforcing bars 5. The C-shape also allows for placement of the coupling sleeve 200 between the two dies 300, 302. As discussed, the crimpable material when heated can conform to the shape of the exposed surfaces of the dies 300, 302, thereby allowing the coupling sleeve 200 to be formed around the ends of the concrete reinforcing bars 5.

The inset dies 300, 302 extend around the C-shape coupling sleeve 200 and compress to mold the coupling sleeve 200 around the concrete reinforcing steel bars 5. The crimping dies 300, 302 are sized for each standard concrete reinforcing bar size and are interchangeable within the respective crimping jaws 132, 134. The C-shape of the coupling sleeve 200 also provides a slight gap to visually confirm the two bars 5 are adequately close, end to end. Additionally, two different sized bars 5 can be used, with a C-shaped coupling sleeve 200 that provides a thicker portion for the thinner bar to be spliced, which is currently not available with other coupling methods. In other words, due to the open nature of the C-shaped coupling sleeve 200, two different diameter bars 5 can be inserted into the opening of the coupling sleeve 200 (so long as both can be received within the opening). The coupling sleeve 200 in this embodiment thus has a first section (e.g., a first half) that has a first material thickness and a second section (e.g., the other second half) that has a second material thickness, wherein the first material thickness is greater than the second material thickness. The first section is placed around the bar 5 that has the smaller diameter, while the second section is placed around the bar 5 that has the larger diameter.

The length of the coupling device 200 is selected such that it covers a sufficient length of the end of each reinforcing bar 5. For example, the length of the coupling device 200 can be between 3 and 6 inches.

Heating Mechanism

The coupling device 100 includes a heating mechanism for controlled heating of the coupling sleeve 200 to allow for deformation and shaping of the coupling sleeve 200 around the ends of the concrete reinforcement bars 5 and within the dies 300, 302.

In the illustrated embodiment, there is a first heating element 400 associated with the first jaw 132 and a second heating element 402 associated with the second jaw 134. As shown, the first heating element 400 can be embedded within the first jaw 132 and is proximate to the first surface 133 and similarly, the second heating element 402 can be embedded within the second jaw 134 and is proximate to the second surface 135.

The coverage of the first and second heating elements 400, 402 is complementary to the area of the first surface 133 and the area of the second surface 135. 135. As mentioned, each of the first surface 132 and the second surface 134 can have a curved (arcuate) surface and in one embodiment, the first and second heating elements 400, 402 have complementary curved shapes.

The first and second heating elements 400, 402 can each be in the form of an induction heater that is embedded within the respective crimping jaw 132, 134. The heating elements transfer heat energy directly to the C-shaped coupling sleeve by means of magnetic eddy currents.

A heat exchanger 500 can be provided within the housing 110 near the proximate end 104. As is known, heat exchanger 500 works by transferring heat from one place to another. In this case, the heat exchanger 500 is open to atmosphere along the sides of the housing 110. As is known, induction heating is the process of heating an electrically conducting object by electromagnetic induction through heat generated in the object by eddy current.

Prior to crimping, the coupling sleeve 200 is heated to steel forging temperatures by the two induction heaters (first and second heating elements 400, 402) embedded in the crimping jaws 132, 134 of the device 100. Heating the coupling sleeve 200 to a high temperature increases the malleability of the steel, which reduces the force required by the crimping jaws 132, 134. Additionally, unlike crimped splices for metal pipes and plain metal bars, heating the coupling sleeve 200 allows the steel to mold around the ridges of the concrete reinforcing bars 5, which locks the two bars 5 and the coupling sleeve 200 together mechanically. The reduced crimping force also allows the device 100 to be smaller, lighter, and more mobile. The method also allows for a variety of bar textures, including threaded, grooved, or traditional deformed rebar.

The heating mechanism further includes a temperature sensor 510 for monitoring the temperature of the coupling sleeve 200. The temperature sensor 510 can be any number of suitable devices that are configured to measure the temperature of the coupling sleeve 200. The measurement range of the temperature sensor 510 is suitable for its intended application and more particularly, the temperature sensor 510 can have a range up to 2,500° F. which ensures consistent and reliable temperatures for every splice (the process by which the ends of the reinforcing bars 5 are joined with the coupling sleeve 200).

The temperature sensor 510 is thus configured to indicate when the un-crimped coupling sleeve 200 reaches the steel forging temperature at which time, the actuator 120 can be actuated to cause the closing of the jaws 132, 134.

The temperature sensor 510 can be an infrared temperature sensor 510. The temperature sensor 510 readings are coordinated with the jaw movement by the on-board central processing unit (CPU).

In one embodiment, as soon as the coupling device 100 is powered on, the heating mechanism is also powered on and the coupling sleeve 200 is immediately heated using the two heaters 400, 402. Alternatively, the heating mechanism can be operatively connected to actuator 120 such that when the actuator 120 is placed into the operating position in which the jaws 132, 134 are closed, the heating mechanism is powered on. Alternatively, the heating mechanism can be manually turned on or off using an actuator (e.g., a button).

In addition, the device 100 can include on its housing 110 (e.g., such as the top surface thereof) a display and control buttons that allow user inputs to be entered. The temperature of the coupling sleeve 200 can be displayed on the display as a temperature reading. The control buttons can be used to perform various activities such as changing the reading from Celsius to Fahrenheit and adjusting the temperature of the induction heaters (e.g., increase or lower the temperature). In addition, the display can be a touchscreen that includes pull down menus that allow the user to input certain information including the information mention above.

Alternatively, the heating mechanism is preprogramed to reach a certain temperature that is at least the forging temperature of the coupling sleeve 200 when it is powered up.

In addition, the device 100 can include a timer that is automatically started when the jaws 132, 134 are closed. The timer can countdown on the display. A processor (PCB) is included within the housing 110 and is connected to the display, the temperature sensor 510 and the other working components. Once the programmed time for complete splicing has elapsed, the user can be alerted on the display and/or an audio cue, such as a beep, can be generated and heard through a small speaker integrated into the housing 110. Visual cues, such as a flashing message on the display, can also be provided. Alternatively, the display and user interface can be part of a remote computing device that receives data and information, such as measurements, from the device 100 as by wireless transfer.

The user menu that can be selected through the display can even allow for inputs such as material type for the coupling sleeve 200. In this way, if a different material is used that has a different forging temperature, the user can select it from the menu before beginning the process. The processor then reads from a database both the forging temperature needed for the selected material and the time required to complete the task. The processor then instructs the heating mechanism to heat to at least this temperature and also once the jaws 132, 134 are closed, the time is counted down.

FIGS. 9A-9C are views of an existing alternative splice mechanism that fails to include the features of the present invention. This mechanism is used to join two bars as shown.

Vision System

In accordance with another aspect of the present disclosure, a vision system 600 can be provided and is configured to provide an image or live stream video of a target location of the device 100. In the present application, the vision system 600 is forward facing to give a view of the crimping area and allow viewing of the reinforcing bars 5. As shown in the top view of FIG. 3, the vision system 600 can include a left component near arm 118 and a right component near arm 116. In other words, the vision system 600 can include two imaging devices one on each side of the device 100.

Any number of conventional vision systems and imaging devices can be used in the present application. For example, the vision system 600 can be a camera (e.g., CCD camera) or other type of imaging device. The images from the vision system 600 are transferred to the user as by wireless transfer to the display of a computing device (e.g., smart device). The vision system 600 can thus provide a live in real time video stream of the crimping area to allow the user to control movement of the robotic mobile platform. For example, the vision system 600 allows the user to control and drive the mobile platform (vehicle) to the target location and also allows for viewing of the operation of the crimping assembly 130. The vision system 600 allows the user to view the opening of the jaws and the insertion of the bar 5 between the open jaws, as well as viewing the subsequent closing of the jaws and capture of the bar 5. The vision system could also be controlled by trained AI software. It will be understood, as well, that the robotic welding gun can automated and the vision system helps train the AI.

Electrical Contact

In another aspect, an electrical contact device 700 is provided and in particular, the electrical contact device 700 comprises two parts, namely a first part that acts as a transmitter (electrical pulse generator) and a second part that acts as a receiver or electrical pulse sensor. It will be seen and appreciated that one part is located near the arm 116 and the other part is located near the arm 118.

Once the splice is completed by the coupling device 100, the integrity of the splice is verified by sending an electrical pulse from one bar 5, across the splice, and to the other bar 5 where the pulse is measured. The electrical pulse is sent by a first electrical contact 700 on one side of the crimping jaw coming into contact with the first bar 5 and is sensed by a second electrical contact 700 coming into contact with the second bar 5. In this arrangement, the first electrical contact 700 acts as an electrical pulse generator and the second electrical contact 700 acts as an electrical pulse sensor that is configured to detect, record and measure a sensed electrical pulse.

This measurement process ensures that there is adequate contact and bonding between the coupling sleeve 200 and the reinforcement bars 5.

Splicing Sequences

Figure 10A:
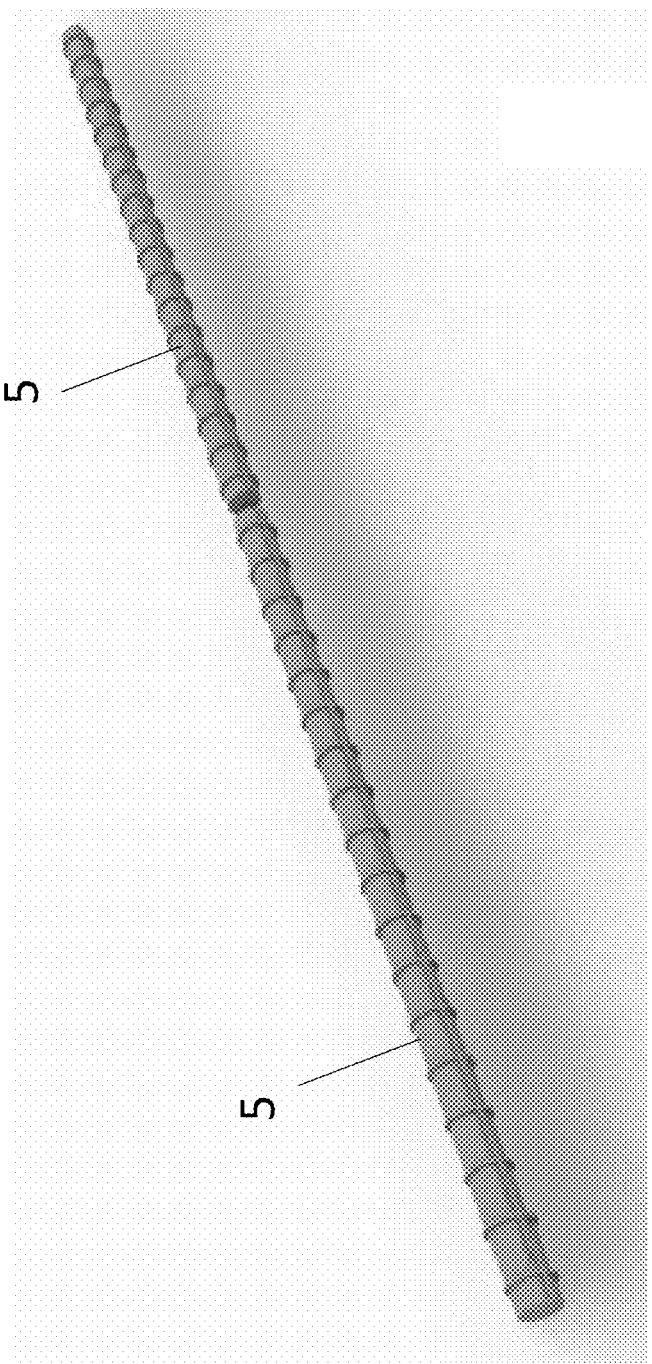

FIG. 10A shows a pair of concrete reinforcing bars 5 with the ends placed side-by-side so as to form a continuous bar structure.

Figure 10B:
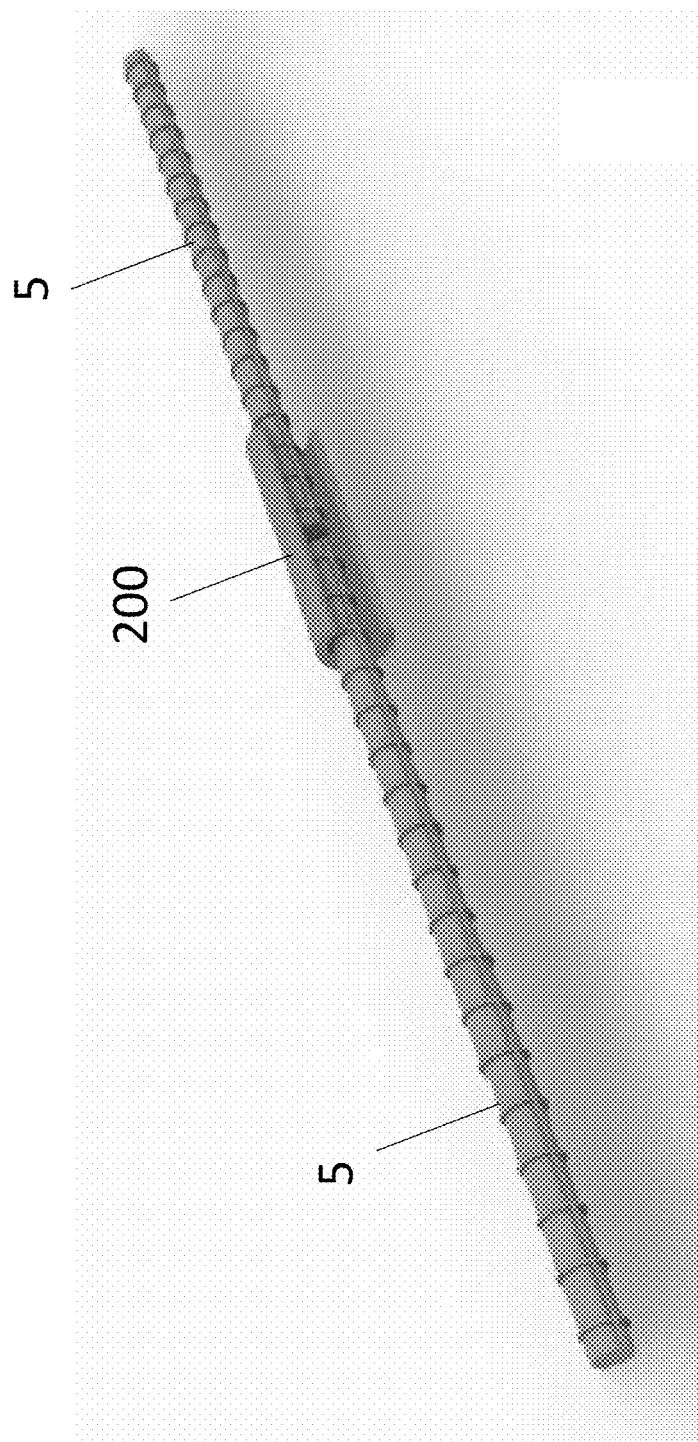

FIG. 10B shows the un-crimped coupling sleeve 200 disposed about the ends of the concrete reinforcing bars 5. As shown, the un-crimped coupling sleeve 200 covers an end portion of each concrete reinforcing bar 5 since the coupling sleeve 200 is in effect forged and joined to these end portions. In other words, the length of the coupling sleeve 200 must be sufficient to produce a robust splicing and joining of the ends of the bars 5.

Figure 10C:
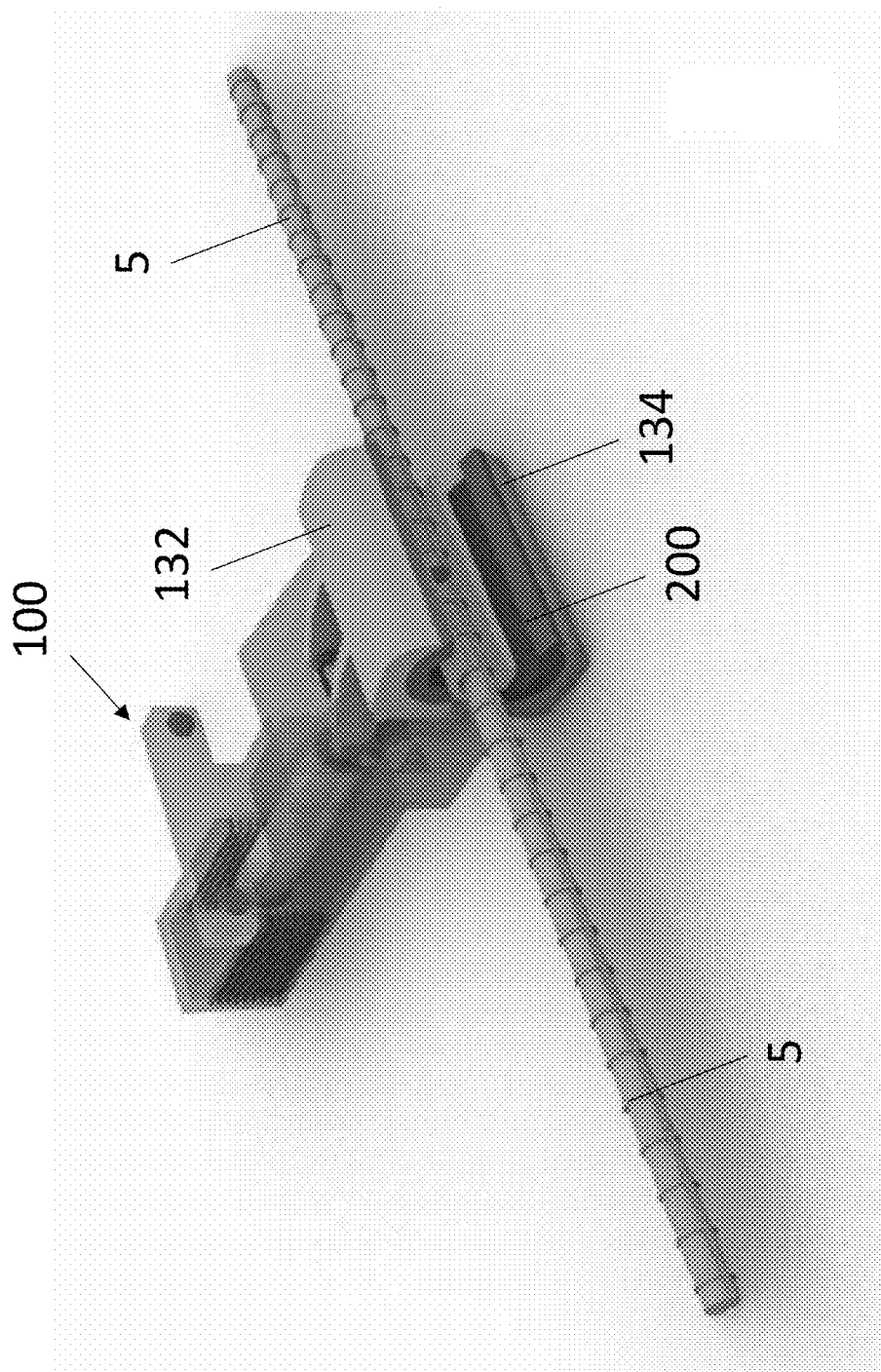

FIG. 10C shows the coupling device 100 with the jaws 132, 134 in the open position and the un-crimped coupling sleeve 200 being inserted and held within the two dies 300, 302. In this case, the coupling sleeve 200 has a C-shape. The coupling device 100 is positioned such that the side-by-side ends of the concrete reinforcing bars 5 are inserted into the open space within the C-shape coupling sleeve 200. In this position, the coupling sleeve 200 is heated using the two induction heaters 400, 402 causing heating of the coupling sleeve 200 to its forging temperature. At this temperature, the coupling sleeve 200 is malleable. As shown in FIG. 10C, the interface (break) between the two ends of the two bars 5 is centrally located within the coupling device 100. The induction heaters 400, 402 can be in the form of induction coils embedded in the body of the respective jaw 132, 134.

Figure 10D:
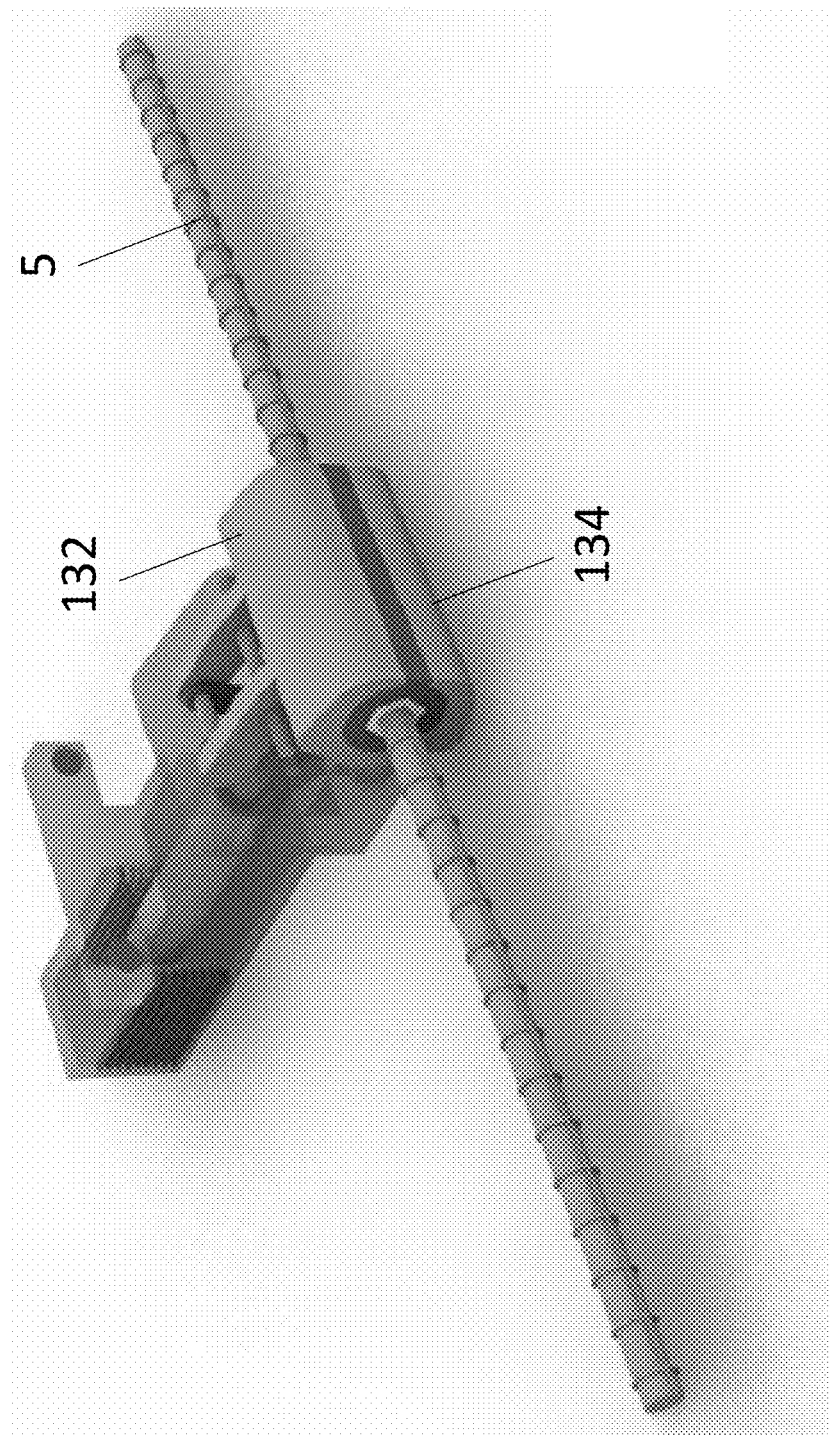

Once the measured temperature of the coupling sleeve 200 has reached the target temperature which is a temperature that is at least the forging temperature, the actuator is manipulated to cause the first and second jaws 132, 134 to compress. When the jaws 132, 134 close, the malleable coupling sleeve 200 is deformed and the C-shape is closed and the coupling sleeve 200 fills out the dies 300, 302 as shown in FIG. 10D. When the combined dies 300, 302 define a hex shaped opening, the coupling sleeve 200 is formed to generally have in one embodiment a hex shape and surrounds the ends of the bars 5.

Figure 10E:
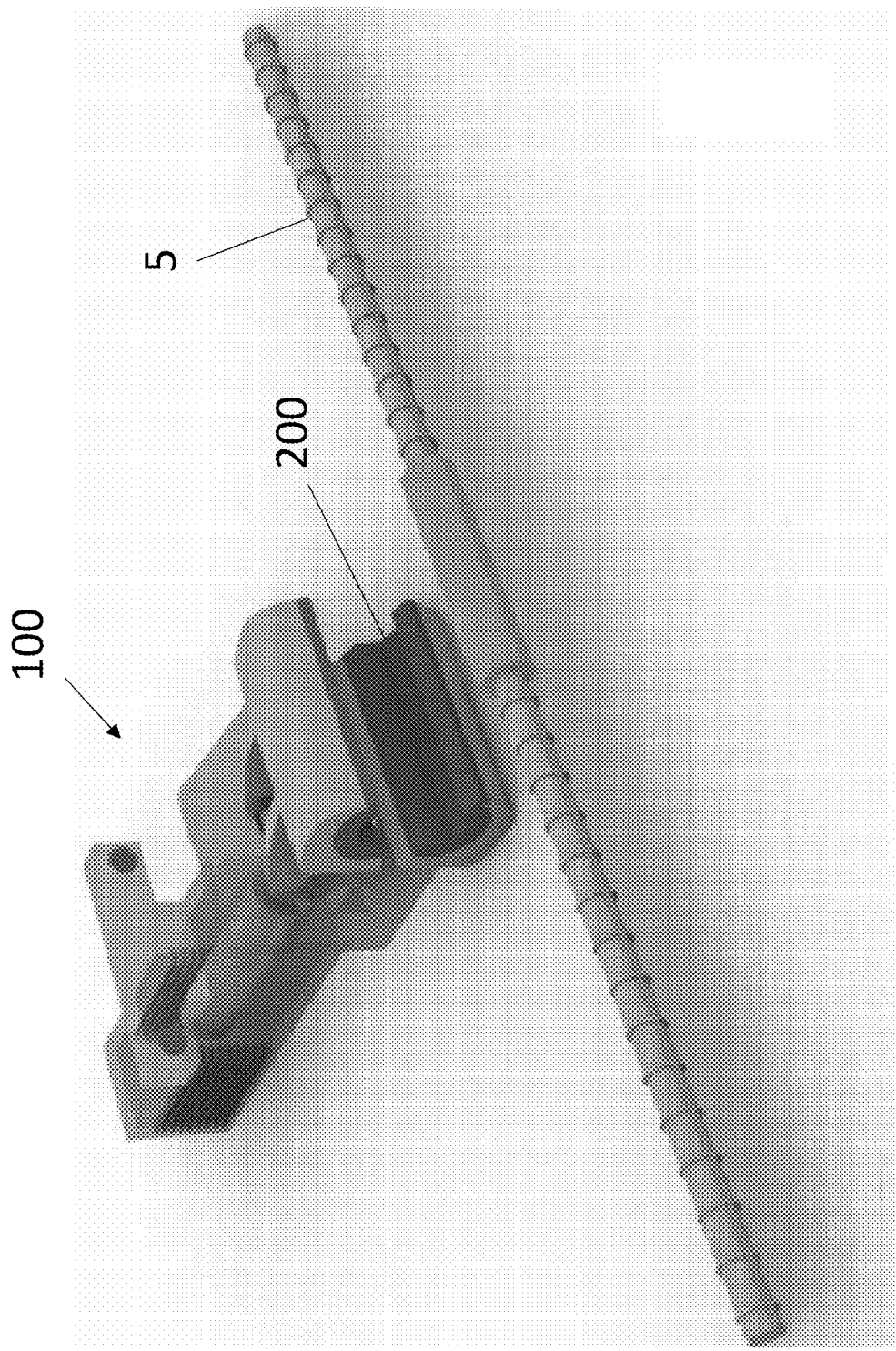

FIG. 10E shows that once the requisite time has passed, the user then manipulates the actuator by use of a press-button or by a remote control device to cause the jaws 132, 134 to open. The dies 300, 302 are separated from the now formed coupling sleeve 200. The formed coupling sleeve 200 is crimped onto the end portions of the bars 5, thereby joining the two bars 5 together.

Figure 10F:
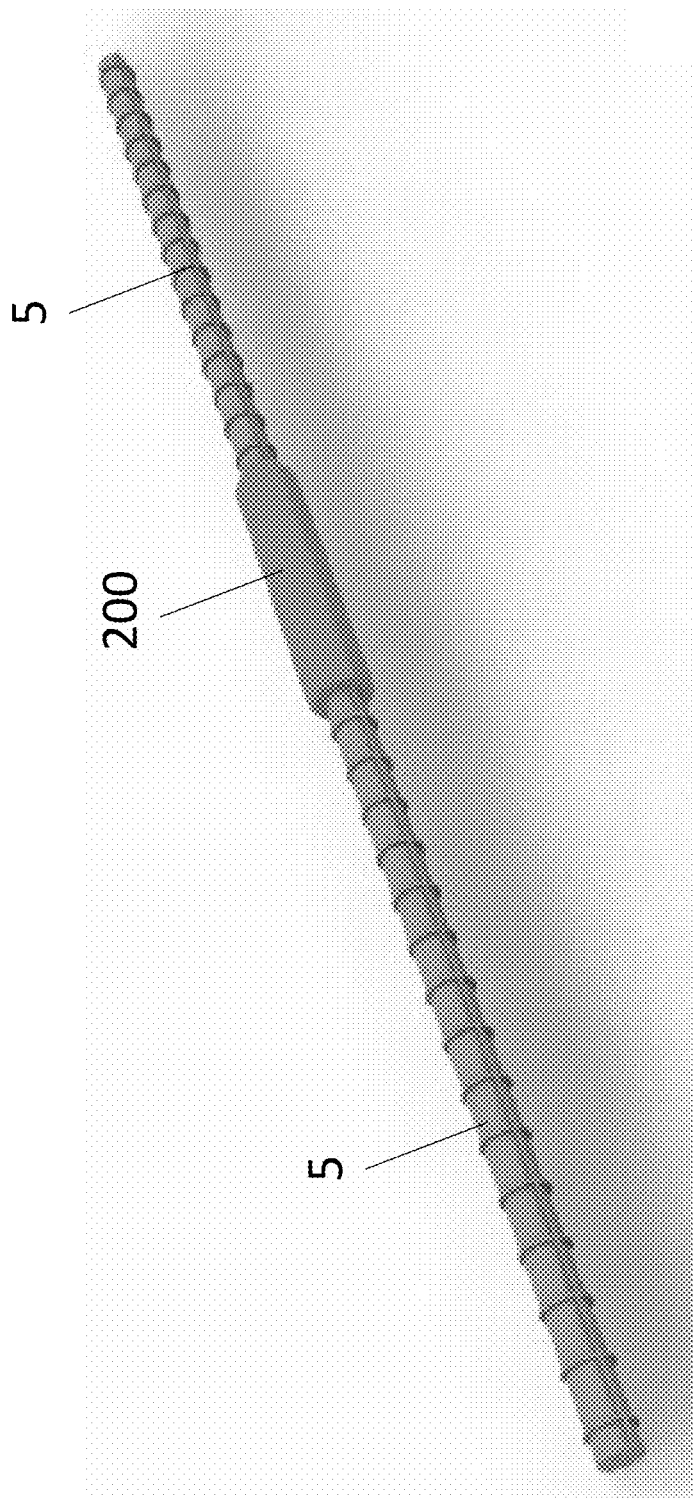

FIG. 10F shows the final resulting joined structure in which the two bars 5 are joined by the crimped coupling sleeve 200.

As described herein, the device 100 provided a number of advantages over conventional devices. The device 100 is configured to connect two concrete reinforcing steel bars 5 end to end and can be used to replace welded splices. The present splice method is substantially faster than welding while also exceeding the strength of welded bar splices. This results in a reinforcement bar connection that can replace lap splices, which significantly reduces the amount of steel and minimizes reinforcement congestion. Additionally, the speed of this splicing method reduces construction time and labor.

The C-shape coupling sleeve 200 can be used to connect concrete reinforcing steel bars 5 and is hot-swaged by the hand-held device 100. The C-shape allows the two bars 50 to be placed with tolerance in all six degrees of freedom, and the crimping device 100 then forces the bars 5 into alignment. This unique benefit allows structural steel bars 5 from two precast concrete elements to be connected quickly and with a minimal protrusion from the existing or new precast concrete.

Hand-Held Unit

As mentioned, FIG. 11 illustrates a hand-held version of the device 100. In this embodiment, the proximal end 104 is connected to the power cord 30 that has a plug at the end that can be inserted into the electric outlet. Along the top 106, the housing 110 has a rear handle 112 that allows the user to insert a hand to hold the coupling device 100. The rear handle 112 thus has an opening through which the hand is inserted. Also, along the top 106, the housing 110 has a front handle 114 that is also configured to be grasped by the hand of the user. The user can thus hold the coupling device 100 using both the rear handle 112 and top handle 114. A trigger 11 can be provided for operating the hand-held unit. Manipulating the trigger 11 can cause the on/off operations of the device.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not precludes the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A hot-swaged coupling device for connecting a first member to a second member comprising:
    a housing;
    a first jaw and a second jaw each of which is movably coupled to the housing and moves between an open position and a closed position, the first jaw having a first surface and the second jaw having a second surface that faces the first surface;
    first and second interchangeable dies, the first interchangeable die being coupled to the first surface, while the second interchangeable die being coupled to the second surface, wherein in the closed position of the first and second jaws, the first and second interchangeable dies seat against one another and define an enclosed opening, wherein each of the first interchangeable die and the second interchangeable die has an exposed inner surface for receiving and forming a coupling sleeve about ends of the first member and the second member when the first and second jaws are in the closed position and the first member and the second member are in abutting relationship; and
    a heating mechanism for heating the coupling sleeve.

2. The coupling device of claim 1, further including an actuator that is configured to move the first and jaws between the open and closed positions.

3. The coupling device of claim 2, wherein the actuator includes a hydraulic piston that has a movable piston rod that has a distal end and a linkage mechanism that operatively couples the piston rod to the first jaw and the second jaw.

4. The coupling device of claim 3, wherein the linkage mechanism comprises a first link connected at a first end to the piston rod and at a second end to the first jaw and a second link connected at a first end to the piston rod and at a second end to the second jaw.

5. The coupling device of claim 4, wherein in an extended position of the piston rod, the first jaw and the second jaw are in the closed position and wherein in a retracted position of the piston rod, the first jaw and the second jaw are in the open position.

6. The coupling device of claim 1, wherein the first jaw pivots about a first fulcrum pin and the second jaw pivots about a second fulcrum pin.

7. The coupling device of claim 3, wherein the hydraulic piston is oriented in a longitudinal direction within the housing.

8. The coupling device of claim 1, wherein the first interchangeable die comprises an insert that is received within a recessed portion of the first surface and the second interchangeable die comprises an insert that is received within a recessed portion of the second surface.

9. The coupling device of claim 1, wherein the exposed inner surface of each of the first interchangeable die and the second interchangeable die is defined by three angled surfaces such that the enclosed opening has a hexagon shape.

10. The coupling device of claim 1, wherein the heating mechanism includes a first induction heater that is located within the first jaw for controlled heating of the coupling sleeve and a second induction heater that is located within the second jaw for controlled heating of the coupling sleeve, the first induction heater being proximate to the first surface and the second induction heater being proximate to the second surface.

11. The coupling device of claim 10, wherein each of the first induction heater and the second induction heater has a curved shaped.

12. The coupling device of claim 1, further including a temperature sensor configured to measure a temperature of the coupling sleeve.

13. The coupling device of claim 12, wherein the housing includes electronics includes a processor and memory for controlling the heating mechanism and for alerting a user when the measured temperature of the coupling sleeve reaches a target temperature that is a temperature equal to or greater than a forging temperature of the coupling sleeve.

14. The coupling device of claim 13, wherein the target temperature comprises a steel forging temperature.

15. The coupling device of claim 1, wherein the coupling sleeve has a first section having a first thickness and a second section having a second thickness, the first thickness being greater than the second thickness.

16. The coupling device of claim 15, wherein the first section is ½ of a total length of the coupling sleeve and the second section is ½ of the total length.

17. The coupling device of claim 1, wherein the first member comprises a first concrete reinforcing bar and the second member comprises a second concrete reinforcing bar.

18. The coupling device of claim 1, wherein the coupling sleeve comprises an elongated structure that has a C-shape, the coupling sleeve being formed such that in an initial position, the coupling sleeve is open and can be disposed about the ends of the first member and the second member.

19. The coupling device of claim 1, further including a vision system for capturing images and/or a live, real-time video feed of the first and second interchangeable dies for viewing of the coupling sleeve.

20. The coupling device of claim 19, wherein the vision system comprises one or more cameras.

21. The coupling device of claim 1, further including an electrical contact sensor device comprising a first component that transmits an electrical pulse to the first member and a second component that acts as an electrical pulse sensor and is configured to detect and measure the sensed electrical pulse in the second member.

22. The coupling device of claim 21, wherein the first component comprises a first probe for being placed in direct contact with the first member and the second component comprises a second probe for being placed in direct contact with the second member.

23. The coupling device of claim 1, wherein the housing is coupled to a robotic arm that is operatively coupled to a mobile platform that can be driven and controlled by a user using a remote user interface.

24. The coupling device of claim 23, wherein the mobile platform comprises a wheeled vehicle and the user interface is part of a remote computing device that includes a display, the user interface including controls for driving the vehicle and controlling movement of the robotic arm as well as control of the first and second jaws.

* * * * *